United States Patent
Zhang

(10) Patent No.: US 10,187,272 B2
(45) Date of Patent: Jan. 22, 2019

(54) INTERFACE MANAGEMENT SERVICE ENTITY, FUNCTION SERVICE ENTITY, AND ELEMENT MANAGEMENT METHOD

(71) Applicant: Huawei Technologies Co., Ltd., Shenzhen, Guangdong (CN)

(72) Inventor: Kai Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 223 days.

(21) Appl. No.: 15/247,617

(22) Filed: Aug. 25, 2016

(65) Prior Publication Data
US 2016/0366030 A1    Dec. 15, 2016

Related U.S. Application Data

(63) Continuation of application No. PCT/CN2014/072567, filed on Feb. 26, 2014.

(51) Int. Cl.
*G06F 15/173*    (2006.01)
*H04L 12/24*    (2006.01)
*H04L 29/08*    (2006.01)

(52) U.S. Cl.
CPC .......... *H04L 41/50* (2013.01); *H04L 41/0226* (2013.01); *H04L 67/10* (2013.01)

(58) Field of Classification Search
USPC ................ 709/217, 218, 223, 226, 230, 238
See application file for complete search history.

(56) References Cited

U.S. PATENT DOCUMENTS 9,201,938 B2 * 12/2015 Fischer ............ G06F 17/30569
9,246,819 B1 *  1/2016 Thirasuttakorn ..... H04L 47/125
(Continued)

FOREIGN PATENT DOCUMENTS

CN    101478832 A    7/2009
CN    102104997 A    6/2011
(Continued)

OTHER PUBLICATIONS

"Next Generation Converged Operations Requirements", 3GPP Draft; S5-132097 NGMN Next Generation Converged Operations Requirements—Final Deliverable; 3rd Generation Partnership Project (3GPP); Nov. 12, 2013; 490 pages.
(Continued)

*Primary Examiner* — Liang Che A Wang

(57) ABSTRACT

The present application provides an interface management service entity, a function service entity, and an element management method. After receiving a device management service request message sent by a network element, a cloud computing-based interface management service entity invokes, according to a network standard identifier and a request service type that correspond to the network element and are carried in the device management service request message, a service function of a function service entity in a cloud computing-based element management system to generate a service request response message; and sends the service request response message to the network element corresponding to the network standard identifier. According to the technical solutions, a cloud computing-based element management system manages multiple network elements working in different standards, which avoids a resource waste problem caused when multiple element management systems manages network elements working in different standards, and effectively improves hardware utilization.

11 Claims, 10 Drawing Sheets

(56) References Cited

U.S. PATENT DOCUMENTS

| | | | |
|---|---|---|---|
| 9,338,248 B2* | 5/2016 | Fischer | H04L 69/08 |
| 2004/0181541 A1 | 9/2004 | Groenendaal et al. | |
| 2005/0080886 A1 | 4/2005 | Croy et al. | |
| 2005/0091576 A1 | 4/2005 | Relyea et al. | |
| 2007/0294379 A1 | 12/2007 | Jiang et al. | |
| 2011/0246773 A1* | 10/2011 | Sidle | G06F 21/305 |
| | | | 713/168 |
| 2014/0136620 A1* | 5/2014 | Son | H04L 67/2823 |
| | | | 709/204 |

FOREIGN PATENT DOCUMENTS

| | | |
|---|---|---|
| CN | 102131205 A | 7/2011 |
| CN | 102571440 A | 7/2012 |
| CN | 102695194 A | 9/2012 |
| RU | 2371758 C2 | 10/2009 |

OTHER PUBLICATIONS

Rosilah Hassan et al., "Architecture of Network Management Tools for Heterogeneous System", International Journal of Computer Science and Information Security, vol. 6, No. 3, 2009, p. 31-40.

"Principles for a telecommunications management network", International Telecommunication Union, ITU-T Recommendation M.3010, Feb. 2000, 44 pages.

Sandeep Adwankar et al., "Universal Manager: Seamless Management of Enterprise Mobile and Non-mobile Devices", IEEE International Conference on Mobile Data Management, 2004, 12 pages.

* cited by examiner

INTERFACE MANAGEMENT SERVICE ENTITY, FUNCTION SERVICE ENTITY, AND ELEMENT MANAGEMENT METHOD

CROSS-REFERENCE TO RELATED APPLICATIONS

This application is a continuation of International Application No. PCT/CN2014/072567, filed on Feb. 26, 2014, which is hereby incorporated by reference in its entirety.

TECHNICAL FIELD

Embodiments of the present invention relates to the field of communications technologies, and in particular, to an interface management service entity, a function service entity, and an element management method.

BACKGROUND

With rapid development of communications technologies, wireless communications technologies are widely applied because of their advantages of convenience, efficiency, and low costs on transmitting information. In a wireless communications system, a commonly used wireless network includes a single-standard network and a heterogeneous network.

The single-standard network is a network in which network elements in the network work in a same network standard, and the heterogeneous network generally includes wireless network element nodes of different scales and different roles. In the foregoing single-standard network and the heterogeneous network in which a large quantity of network elements exist, element management is generally implemented by using an EMS (element management system).

During element management of the single-standard network, it is determined, according to a quantity of network elements in the single-standard network, that one or multiple EMSs are needed to process multiple network elements in the single-standard network. In the heterogeneous network, because network elements working in multiple standards exist, and generally, one EMS corresponding to each standard is needed to manage network elements in the standard, multiple EMSs generally exist in the heterogeneous network.

In the foregoing wireless network, each EMS manages network elements corresponding to each EMS, thereby causing that some operations performed by all EMSs are the same. For example, referring to FIG. 1, a heterogeneous network includes an LTE network standard, a 3G (3rd Generation) network standard, and a WLAN standard. An EMS corresponding to the LTE network standard is an EMS A, an EMS corresponding to the 3G network standard is an EMS B, and an EMS corresponding to the WLAN standard is an EMS C. The EMS A, the EMS B, and the EMS C are separated from each other, and manage network elements in their respective standards. A large quantity of repetitions of functions such as sending an alarm, recording or storing a log exist among the EMS A, the EMS B, and the EMS C, and a large quantity of function repetitions cause a resource waste problem of EMS hardware devices and relatively low utilization. In addition, a large quantity of hardware devices cause high hardware maintenance costs.

It may be learned that problems of low hardware resource utilization and high hardware maintenance costs exist in an existing process in which an EMS manages a network element.

SUMMARY

Embodiments of the present invention provide an interface management service entity, a function service entity, and an element management method, so as to resolve problems of low hardware resource utilization and high hardware maintenance costs in a process in which an EMS manages a network element.

According to a first aspect, an interface management service entity is provided, and is located in a cloud computing-based element management system, where the element management system further includes a network element and a function service entity, and the interface management service entity includes:

a southbound interface module, configured to receive a device management service request message sent by the network element, and obtain a network standard identifier that corresponds to the network element and is carried in the device management service request message; and a function adaptation module, configured to: perform protocol conversion on the device management service request message according to a protocol format corresponding to the network standard identifier; send, according to a service type carried in a device management service request message obtained after the protocol conversion, the device management service request message to the function service entity; and receive a service request response message that is generated according to the device management service request message and sent by the function service entity; where the southbound interface module is further configured to send the service request response message to the network element.

With reference to the first aspect, in a first possible implementation manner, the southbound interface module is specifically configured to read an interface identifier corresponding to the network standard identifier, obtain a southbound interface corresponding to the interface identifier, and receive the device management service request message by using the southbound interface corresponding to the interface identifier.

With reference to the first possible implementation manner of the first aspect, in a second possible implementation manner, the function adaptation module is specifically configured to perform, according to the protocol format corresponding to the network standard identifier, protocol conversion on the device management service request message parsed by the southbound interface, to generate a device management service request message in a uniform protocol format.

With reference to the first aspect, in a third possible implementation manner, the function adaptation module is specifically configured to: obtain, according to a network standard identifier carried in the service request response message, an interface identifier corresponding to the network standard identifier, where the service request response message is a message in a uniform protocol format; and send the service request response message in the uniform protocol format to a southbound interface corresponding to the interface identifier.

With reference to the third possible implementation manner of the first aspect, in a fourth possible implementation manner, the southbound interface module is specifically configured to: receive the service request response message that is in the uniform protocol format and sent by the function adaptation module, perform protocol conversion on the service request response message in the uniform protocol format, to generate a service request response message in the protocol format corresponding to the network standard identifier, and send, to the network element by using the southbound interface corresponding to the interface identifier, the service request response message in the protocol format corresponding to the network standard identifier.

According to the foregoing technical solution, a phenomenon that an element management system corresponding to a busy network runs with full load and an element management system corresponding to an idle network runs with low load caused when network elements in multiple network standards need to be managed by multiple element management systems is avoided. Management on network elements in multiple network standards can be implemented by using only one cloud computing-based element management system, and all load on networks is managed, which improves system performance. In addition, functions of original multiple element management systems are implemented by using one element management system, which avoids a function repetition problem in the multiple element management systems, and effectively reduces hardware costs for network element management and hardware maintenance costs of an element management system.

With reference to the first possible implementation manner to the fourth possible implementation manner of the first aspect, in a fifth possible implementation manner, the interface management service entity further includes a management module, configured to receive a device management instruction sent by a client, and obtain permission information carried in the device management instruction; and manage, according to the device management instruction, a platform-level service of the cloud computing-based element management system if the permission information meets a preset management permission condition.

According to a second aspect, a function service entity is provided, and is located in a cloud computing-based element management system, where the element management system further includes a network element and an interface management service entity, and the function service entity includes:

a network standard adaptation module, configured to receive a device management service request message sent by an interface management service entity; and a universal function adaptation module, configured to generate a service request response message according to the device management service request message; where the network standard adaptation module is further configured to send the service request response message to the interface management service entity, so that the interface management service entity sends the service request response message to a corresponding network element, where the corresponding network element is a network element that sends a device management service request message to the interface management service entity.

With reference to the second aspect, in a first possible implementation manner, the network standard adaptation module is specifically configured to obtain, according to a network standard identifier carried in the device management service request message, a network standard adaptation submodule corresponding to the network standard identifier, and parse the device management service request message by using the network standard adaptation submodule corresponding to the network standard identifier, where each network standard identifier corresponds to one network standard adaptation submodule.

With reference to the first possible implementation manner of the second aspect, in a second possible implementation manner, the universal function adaptation module is specifically configured to generate a service request response message according to a parsed device management service request message; or generate a service request response message based on a parsed device management service request message, where all network standard identifiers correspond to the universal function adaptation module, and the service request response message carries a network standard identifier corresponding to the network element.

According to the foregoing technical solution, an interface management service entity invokes, according to a device management service request message sent by a network element, a related service provided by a function service entity located in a cloud computing-based element management system, that is, manages all services and data provided by multiple element management system, which implements that different network standards share services and data in one element management system, and effectively reduces system development costs.

According to a third aspect, an element management method is provided, and is applied in a cloud computing-based element management system, where the element management system includes a network element, a function service entity, and an interface management service entity, and the method includes:

receiving, by the interface management service entity, a device management service request message sent by the network element, and obtaining a network standard identifier that corresponds to the network element and is carried in the device management service request message;

performing, by the interface management service entity, protocol conversion on the device management service request message according to a protocol format corresponding to the network standard identifier;

sending, by the interface management service entity according to a service type carried in a device management service request message obtained after the protocol conversion, the device management service request message to a function service entity; receiving a service request response message that is generated according to the device management service request message and sent by the function service entity; and sending, by the interface management service entity, the service request response message to the network element.

With reference to the third aspect, in a first possible implementation manner, the interface management service entity reads an interface identifier corresponding to the network standard identifier, selects, from a southbound interface module of the interface management service entity, a southbound interface corresponding to the interface identifier, and receives the device management service request message by using the southbound interface corresponding to the interface identifier.

With reference to the first possible implementation manner of the third aspect, in a second possible implementation manner, the interface management service entity parses the device management service request message by using the southbound interface corresponding to the network standard identifier; and the interface management service entity performs, by using a local function adaptation module according to the protocol format corresponding to the network standard identifier, protocol conversion on the parsed device management service request message, to generate a device management service request message in a uniform protocol format.

With reference to the third aspect, in a third possible implementation manner, the interface management service entity obtains, according to a network standard identifier carried in the service request response message, an interface identifier corresponding to the network standard identifier, where the service request response message is a message in a uniform protocol format; the interface management service entity sends the service request response message in the uniform protocol format to a southbound interface corresponding to the interface identifier, and performs protocol conversion on the service request response message in the uniform protocol format by using the southbound interface corresponding to the interface identifier, to generate a service request response message in the protocol format corresponding to the network standard identifier; and the interface management service entity sends the service request response message in the protocol format corresponding to the network standard identifier to the network element by using the southbound interface corresponding to the interface identifier.

According to the foregoing technical solution, a phenomenon that an element management system corresponding to a busy network runs with full load and an element management system corresponding to an idle network runs with low load caused when network elements in multiple network standards need to be managed by multiple element management systems is avoided. Management on network elements in multiple network standards can be implemented by using only one cloud computing-based element management system, and all load on networks is managed, which improves system performance. In addition, functions of original multiple element management systems are implemented by using one element management system, which avoids a function repetition problem in the multiple element management systems, and effectively reduces hardware costs for element management and hardware maintenance costs of an element management system.

With reference to the first possible implementation manner to the third possible implementation manner of the third aspect, in a fourth possible implementation manner, the interface management service entity receives a device management instruction sent by a client, and obtains permission information carried in the device management instruction; and the interface management service entity manages, according to the device management instruction, a platform-level service of the cloud computing-based element management system if the permission information meets a preset management permission condition.

According to a fourth aspect, an element management method is provided, and is applied in a cloud computing-based element management system, where the element management system includes a network element, a function service entity, and an interface management service entity, and the method includes:

receiving, by the function service entity, a device management service request message sent by the interface management service entity; and generating, by the function service entity, a service request response message according to the device management service request message; and sending the service request response message to the interface management service entity, so that the interface management service entity sends the service request response message to a corresponding network element, where the corresponding network element is a network element that sends a device management service request message to the interface management service entity.

With reference to the fourth aspect, in a first possible implementation manner, the function service entity selects, according to a network standard identifier carried in the device management service request message, a network standard adaptation submodule corresponding to the network standard identifier from a network standard adaptation module of the function service entity, and parses the device management service request message by using the network standard adaptation submodule corresponding to the network standard identifier, where each network standard identifier corresponds to one network standard adaptation submodule; and a universal function adaptation module of the function service entity generates a service request response message according to a parsed device management service request message; or the function service entity parses the device management service request message by using a universal function adaptation module of the function service entity, and generates a service request response message based on a parsed device management service request message, where all network standard identifiers correspond to the universal function adaptation module, and the service request response message carries a network standard identifier corresponding to the network element.

In the embodiments of the present invention, after receiving a device management service request message sent by a network element, a cloud computing-based interface management service entity invokes a service function of a function service entity in a cloud computing-based element management system according to a network standard identifier and a request service type that correspond to the network element and are carried in the device management service request message to generate a service request response message, and sends the service request response message to a network element corresponding to the network standard identifier. According to the technical solutions in the present invention, a cloud computing-based element management system manages multiple network elements working in different standards, which avoids a resource waste problem caused when multiple element management systems are used to manage network elements working in different standards, and effectively improves hardware utilization.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be noted that, the technical solutions in the present invention can be applied to various communications systems, such as a GSM (Global System for Mobile Communications) system, a CDMA (Code Division Multiple Access) system, a WCDMA (Wideband Code Division Multiple Access) system, an LTE system, an LTE-A system, and a UMTS.

Figure 1:
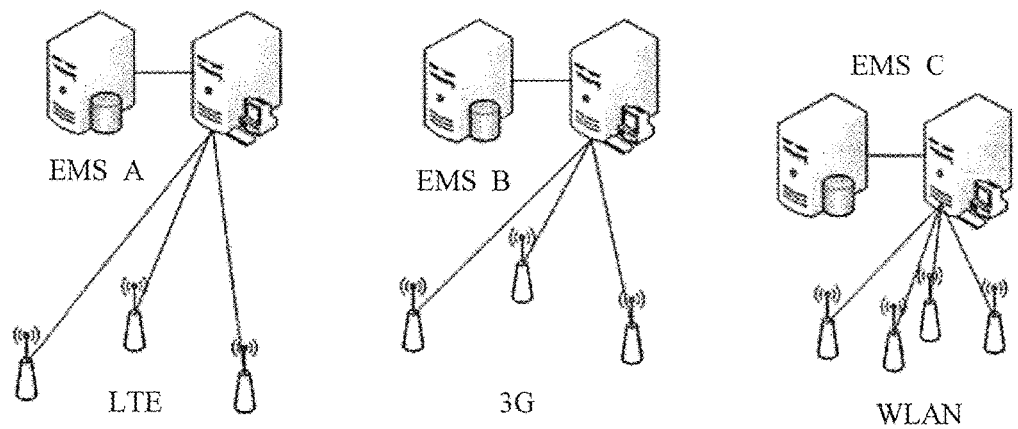
FIG. 1 is a schematic structural diagram of a heterogeneous network in the prior art.
Figure 2:
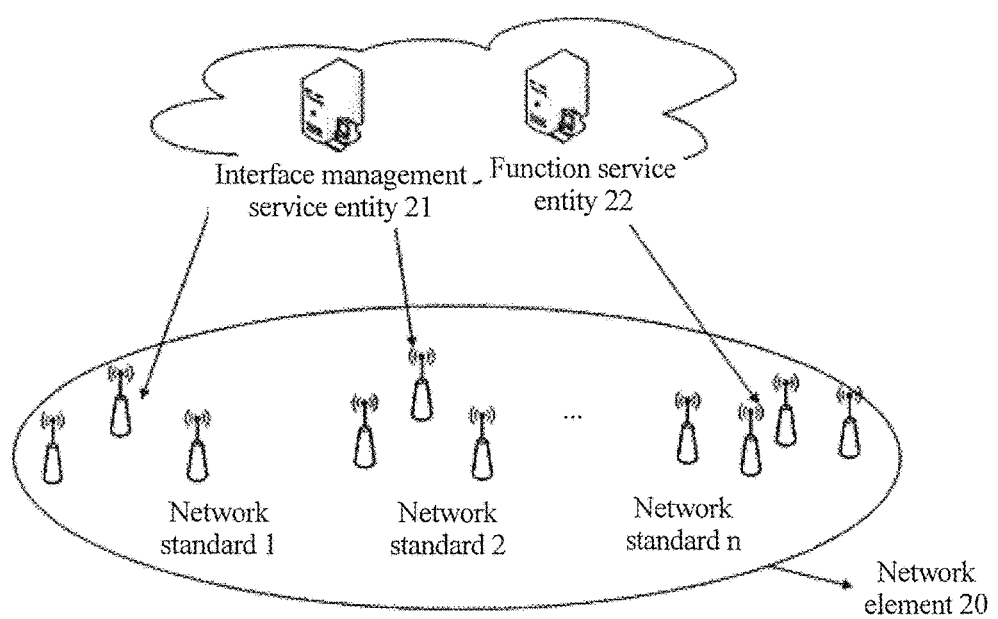
FIG. 2 is a schematic diagram of a cloud computing-based element management architecture according to an embodiment of the present invention.

Referring to FIG. 2, FIG. 2 is a schematic diagram of a cloud computing-based element management architecture according to an embodiment of the present invention. The element management architecture includes at least one network element 20, an interface management service entity 21, and a function service entity 22. When multiple network elements 20 are included, the multiple network elements 20 may be network elements working in a same network standard, or may be network elements working in different network standards. The interface management service entity 21 is configured to receive a device management service request message sent by a network element, forward the device management service request message to a corresponding function service entity 22, and forward, to the network element 20, a device management service response message sent by the function service entity 22. The function service entity 22 is configured to respond to the device management service request message sent by the network element 20, and provide a service corresponding to the device management service request message for the network element 20. The interface management service entity 21 and the function service entity 22 may be independent devices, or may be integrated into one device. The following is described in detail by using an example in which the interface management service entity 21 and the function service entity 22 may be independent devices. Specifically, the network element 20 may be mapped to a communications network element device in an existing communications system, such as a base station, a base station controller, a radio access node, or a radio access controller. The interface management service entity 21 may be mapped to an independent server. The function service entity 22 may be mapped to an element management system in the existing communications system. The network element 20 may be connected to the interface management service entity 21 in a wired or wireless manner. The interface management service entity 21 may be connected to the function service entity 22 in a wired or wireless manner.

To resolve problems of low hardware resource utilization and high hardware maintenance costs in a process in which an EMS manages a network element, in this embodiment of the present invention, after receiving a device management service request message sent by a network element, a cloud computing-based interface management service entity invokes a service function of a function service entity in a cloud computing-based element management system according to a network standard identifier and a request service type that correspond to the network element and are carried in the device management service request message to generate a service request response message, and sends the service request response message to a network element corresponding to the network standard identifier. According to the technical solutions in the present invention, a cloud computing-based element management system manages multiple network elements working in different standards, which avoids a resource waste problem caused when multiple element management systems are used to manage network elements working in different standards, and effectively improves hardware utilization.

The following describes implementation manners of the present invention in detail with reference to the accompanying drawings.

Figure 3:
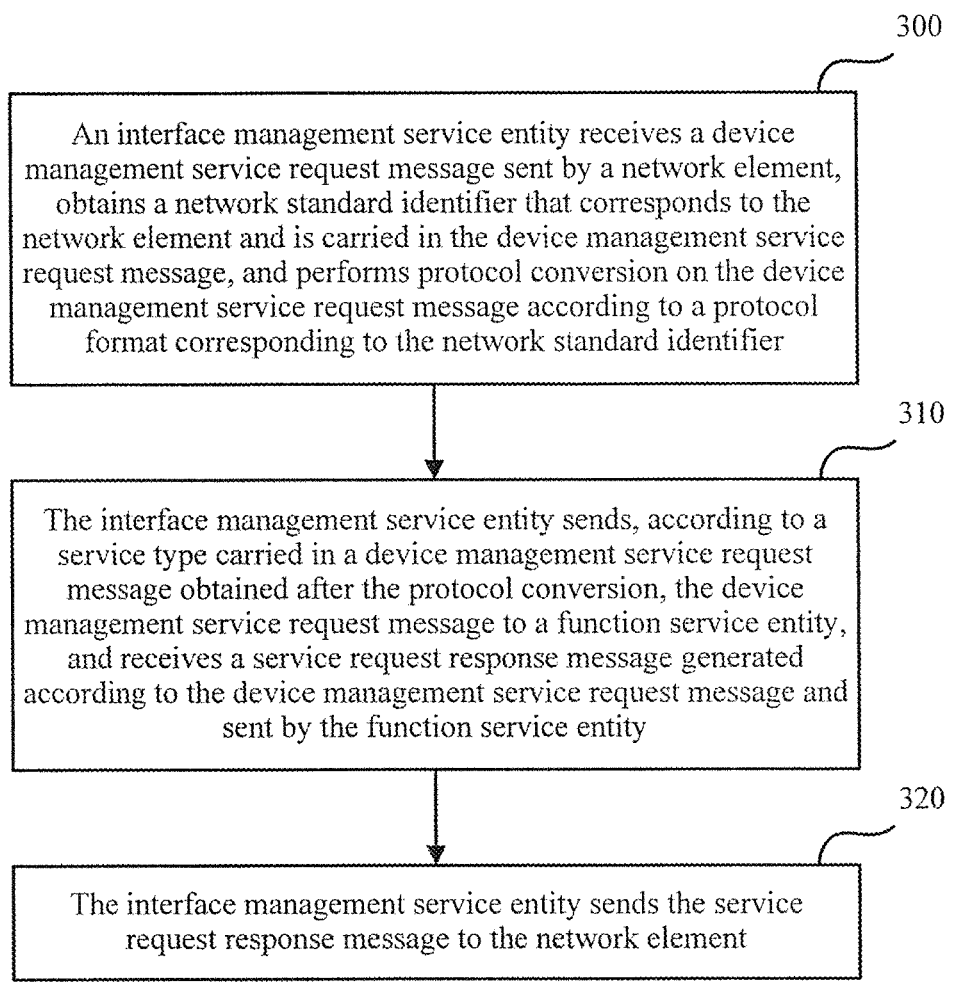
FIG. 3 is a detailed element management flowchart 1 according to an embodiment of the present invention.

Referring to FIG. 3, in the foregoing cloud computing-based element management system, a process of element management performed in this embodiment of the present invention is as follows:

Step 300: An interface management service entity receives a device management service request message sent by a network element, obtains a network standard identifier that corresponds to the network element and is carried in the device management service request message, and performs protocol conversion on the device management service request message according to a protocol format corresponding to the network standard identifier.

In this embodiment of the present invention, when a network element needs to initiate a request for a service, a corresponding device management service request message is generated and sent to the cloud computing-based element management system and the element management system obtains a network standard identifier carried in the device management service request message. The network standard identifier is an identifier of a network standard (such as an LTE network standard or a 3G network standard) in which the network element works.

In addition, the device management service request message further carries a request service type, and the request service type includes one or more of an FM (Fault Management, fault management) service, an AM (accounting management) service, a CM (configuration management) service, a PM (performance management) service, or an SM (security management) service. The FM service is a fault management service and provides three types of services including fault detection, isolation, and correction, for example, maintaining and checking an error log, receiving and responding to an error detection report, tracking and recognizing an error, performing a diagnostic test, and correcting an error. The AM service is an accounting management service and provides a record management service of network resource usage to control and monitor network operation fees and costs. The CM service is a configuration management service and provides initialization and configuration of a network service, so as to provide a network service and implement a specific function or make network performance optimal, for example, setting a parameter related to a routing operation in an open system, managing an object and an object group name, initializing or closing an object, collecting current status information of a system according to a requirement, obtaining critical system change information, and changing system configurations. The PM service is a performance management service and provides an estimation service of system performance such as a running status of system resources and communication efficiency, including monitoring and analyzing a managed network and performance of a service provided by the managed network, collecting and analyzing data information related to a current status of the managed network, maintaining and analyzing a performance log, and the like, for example, collecting statistical information, maintaining and checking a system status log, determining system performance under a natural condition and a manual condition, and changing a system operation mode to perform system performance management. The SM service is a security management service and provides a management service for an authorization mechanism, access control, encryption, and keyword encryption, and a maintenance and check service for a security log, for example, creating, deleting, and controlling a security service and a security mechanism, creating, deleting, and controlling distribution of information related to security, and creating, deleting, and controlling a report of a security-related event.

The cloud computing-based element management system may include five function service entities separately corresponding to the foregoing five request service types, that is, an FM function service entity providing the FM service, an AM function service entity providing the AM service, a CM function service entity providing the CM service, a PM function service entity providing the PM service, and an SM function service entity providing the SM service. These function service entities are deployed based on cloud computing, that is, appear in a form of a cloud computing service. In terms of physical implementation, these function service entities do not need to be centralized to a hardware server, and depend on physical implementation of cloud computing, which avoids a problem of affecting, when traffic of a service request is relatively heavy because multiple functions are integrated into one hardware server, a response to another service request, and effectively improves reliability of an element management system. In addition, in the foregoing element management system, for system upgrade of one or more functions, only a function service entity that corresponds to the function/functions in the foregoing one cloud computing-based element management system need to be upgraded, which avoids a increased system complexity problem caused when system upgrade is separately performed on multiple element management systems, simplifies a system maintenance procedure, and reduces system maintenance costs.

In this embodiment of the present invention, because the protocol format corresponding to the device management service request message is a protocol format corresponding to a network standard in which a network element works, and network elements in different network standards correspond to different protocol formats, the element management system cannot identify the device management service request messages in different protocol formats. Based on this problem, the interface management service entity in the element management system distinguishes protocol formats corresponding to device management service request messages sent by network elements working in different network standards, and performs protocol conversion on the device management service request messages sent by the network elements in different network standards, to convert the device management service request messages into device management service request messages in a uniform protocol format, so as to facilitate subsequent processing on the device management service request messages in the uniform protocol format. The interface management service entity is an independent service entity located in the cloud computing-based element management system, that is, the interface management service entity is not integrated into any one of FCAPS function service entities. However, the function service entity is a service entity located at an opposite end of the interface management service entity. Communication between the interface management service entity and the function service entity is implemented in a wired or wireless manner.

Figure 4:
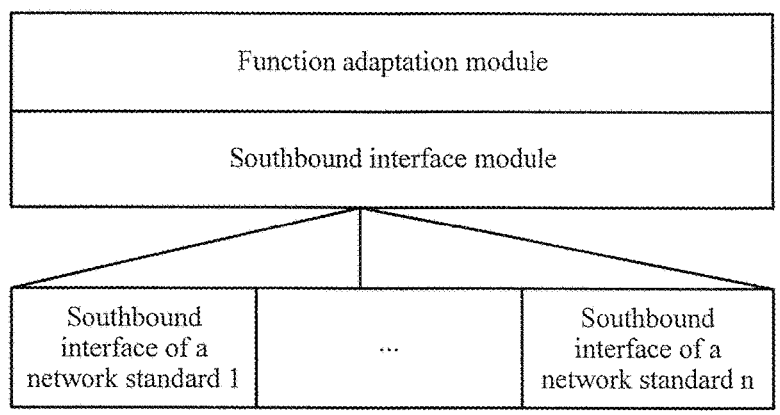
FIG. 4 is a schematic diagram 1 of logical module division of an interface management service entity according to an embodiment of the present invention.

Further, referring to FIG. 4, logical function division is performed on the foregoing interface management service entity, that is, function modules of the interface management service entity are divided into a southbound interface module and a function adaptation module. The southbound interface module includes multiple southbound interfaces, where each southbound interface corresponds to one network standard. The southbound interface is configured to receive a device management service request message sent by a network element in a corresponding network standard. The function adaptation module is configured to perform protocol conversion on device management service request messages received by the different southbound interfaces. In addition, the function adaptation module may further perform protocol conversion on a service request response message sent by a function service entity, that is, convert service request response messages in a uniform protocol format into service request response messages in protocol formats corresponding to different network standards, and send the service request response message to a southbound interface corresponding to a corresponding network standard identifier.

For a device management service request message sent by a network element, a processing process performed by the interface management service entity is as follows: When the interface management service entity receives the device management service request message sent by the network element, the southbound interface module in the interface management service entity identifies a network standard identifier carried in the device management service request message, and obtains an interface identifier corresponding to the network standard identifier; a southbound interface corresponding to the interface identifier is selected from the southbound interface module in the interface management service entity, and the southbound interface receives the device management service request message, parses the device management service request message, and sends a parsed device management service request message to the function adaptation module. The function adaptation module performs protocol conversion on the device management service request message, to generate a device management service request message in a uniform protocol format.

Figure 5:
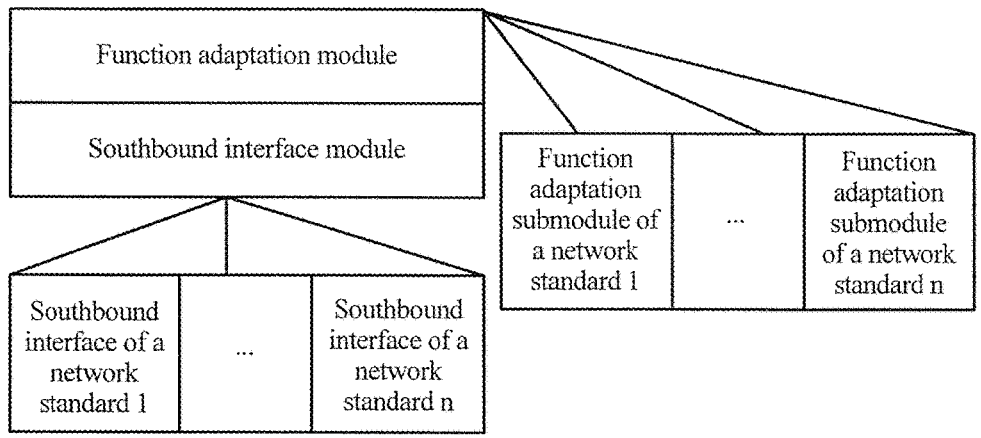
FIG. 5 is a schematic diagram 2 of logical module division of an interface management service entity according to an embodiment of the present invention.

Further, referring to FIG. 5, another method may further be used to perform logical function division on the foregoing interface management service entity, that is, division of a southbound interface module and a function adaptation module. The southbound interface module includes multiple southbound interfaces, where each southbound interface corresponds to one network standard. The southbound interface is configured to receive a device management service request message sent by a network element in a corresponding network standard. The function adaptation module includes multiple function adaptation submodules, and each function adaptation submodule separately corresponds to one southbound interface. The function adaptation submodule is configured to forward a device management service request message received by a southbound interface to a function service entity, or send a service request response message to a corresponding southbound interface.

According to the foregoing technical solution, an interface management service entity is added to an element management system, protocol conversion is performed on a device management service request message sent by a network element, to generate a device management service request message in a uniform protocol format, which resolves a problem that one element management system cannot identify device management service request messages sent by network elements working in different network standards, facilitates subsequent responding to a service requested by the network element in the element management system.

Step 310: The interface management service entity sends, according to a service type carried in a device management service request message obtained after the protocol conversion, the device management service request message to a function service entity, and receives a service request response message that is generated according to the foregoing device management service request message and sent by the function service entity.

In this embodiment of the present invention, the interface management service entity sends, according to the service type carried in the device management service request message, the device management service request message in the uniform protocol format to the function service entity located in the cloud computing-based element management system, that is, invokes a function service entity to provide a service corresponding to the service type, so that the function service entity in the element management system responds to a service request in the device management service request message.

Optionally, when the element management system includes multiple function service entities, the interface management service entity may send, according to the service type carried in the device management service request message, the device management service request message in the uniform protocol format to a function service entity corresponding to the service type, so as to invoke the foregoing function service entity to provide a service corresponding to the service type, so that the function service entity in the element management system responds to a service request in the device management service request message.

Optionally, the function service entity generates, based on the device management service request message, a service request response message in a uniform protocol format, where the service request response message carries a network standard identifier corresponding to the network element.

Figure 6:
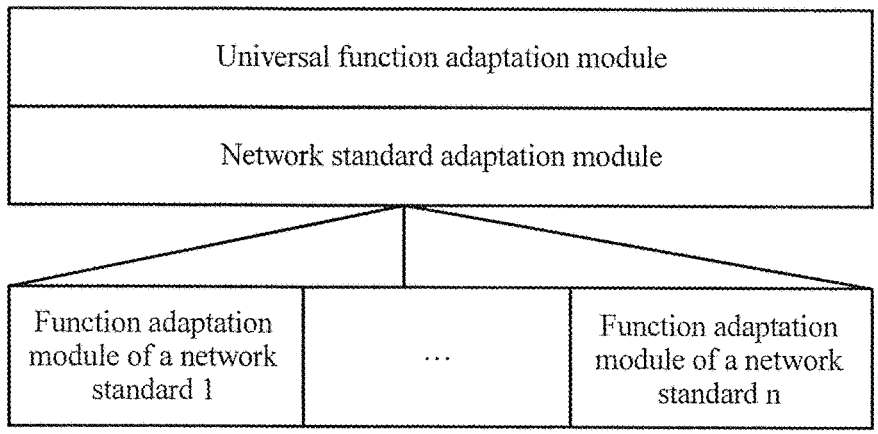
FIG. 6 is a schematic diagram of logical module division of a function service entity according to an embodiment of the present invention.

In addition, because a same service request keyword carried in a device management service request message may indicate different meanings in different network standards, for example, in an LTE network standard, an alarm code in an alarm management service request is 201, which indicates an alarm A, but in a 3G network standard, an alarm code in an alarm management service request is 201, which indicates an alarm B; in this case, an incorrect service request response message is generated if the device management service request message is parsed directly by using the function service entity. To resolve the foregoing technical problem, logical division may be performed on the function service entity, and details are as follows: Referring to FIG. 6, the function service entity is divided into a network standard adaptation module and a universal function adaptation module. The network standard adaptation module includes multiple network standard adaptation submodules, and each network standard adaptation submodule corresponds to one network standard. The network standard adaptation submodule is configured to receive a device management service request message sent by a network element working in a corresponding network standard, and parse a service request keyword carried in the device management service request message. The universal function adaptation module is configured to: generate a service request response message based on a parsed device management service request message, and send the service request response message to a corresponding network standard adaptation submodule; and select a network standard adaptation submodule corresponding to the network standard identifier from all network standard adaptation submodules of the function service entity, and parse the device management service request message by using the network standard adaptation submodule corresponding to the network standard identifier. The universal function adaptation module of the function service entity generates a service request response message based on a parsed device management service request message, where the service request response message carries a network standard identifier, so as to facilitate subsequent processing on and forwarding of the service request response message. According to the foregoing technical solution, an interface management service entity invokes, according to a device management service request message sent by a network element, a related service provided by a function service entity located in a cloud computing-based element management system, that is, manages all services and data provided by multiple element management system, which implements that different network standards share services and data in one element management system, and effectively reduces system development costs.

Step 320: The interface management service entity sends the service request response message to the network element.

In this embodiment of the present invention, the service request response message generated by the function service entity is a message in a uniform protocol format, that is, the service request response message can be identified only by the function service entity, and protocol formats corresponding to network elements in different network standards are different from the uniform protocol format. Therefore, if the service request response message in the uniform protocol format is directly sent to the network element, the network element cannot identify the service request response message in the uniform protocol format. Based on this problem, the interface management service entity needs to perform protocol conversion on the service request response message in the uniform protocol format if a logical division manner shown in FIG. 4 is used, and details are as follows: The interface management service entity obtains, according to the network standard identifier carried in the service request response message in the uniform protocol format, an interface identifier corresponding to the network standard identifier, and sends the service request response message in the uniform protocol format to a southbound interface corresponding to the interface identifier; the interface management service entity performs protocol conversion on the service request response message in the uniform protocol format by using the southbound interface corresponding to the interface identifier, to generate a service request response message in a protocol format corresponding to the network standard identifier, and sends, to the network element, the service request response message in the protocol format corresponding to the network standard identifier.

If logical division manners shown in FIG. 5 and FIG. 6 are used, protocol format conversion is performed on the service request response message by using the universal function adaptation module in the function service entity, and a network standard adaptation submodule that is in the function service entity and corresponds to the network standard identifier carried in the service request response message sends the service request response message to the interface management service entity in the cloud computing-based element management system; the interface management service entity sends the service request response message to the network element directly by using the network standard adaptation submodule corresponding to the network standard identifier and a southbound interface.

According to the foregoing technical solution, a phenomenon that an element management system corresponding to a busy network runs with full load and an element management system corresponding to an idle network runs with low load caused when network elements in multiple network standards need to be managed by multiple element management systems is avoided. Management on network elements in multiple network standards can be implemented by using only one cloud computing-based element management system, and all load on networks is managed, which improves system performance. In addition, functions of original multiple element management systems are implemented by using one element management system, which avoids a function repetition problem in the multiple element management systems, and effectively reduces hardware costs for element management and hardware maintenance costs of an element management system.

Further, the foregoing element management system may also manage partial functions in the system according to an instruction sent by a client, so as to make it convenient for a user to perform routine maintenance work on the element management system. Details are as follows: The client sends a device management instruction to the interface management service entity located in the cloud computing-based element management system; the interface management service entity receives the device management instruction sent by the client, and obtains permission information carried in the device management instruction, where the permission information is a management permission for a user to log in to the cloud computing-based element management system; a platform-level service of the cloud computing-based element management system is managed according to the device management instruction, if the permission information meets a preset management permission condition. The platform-level service includes an operating system, a running environment of a programming language, a database, and a Web server. An EMS provider deploys and runs, on this platform, an application managed by a heterogeneous network element, that is, a function service entity, an interface management service entity, and an EMS database application. The preset management permission condition is a management permission that the user should have when the user executes a corresponding operation. Optional, user permission information may be indicated by a user permission level; correspondingly, the preset management permission condition is a preset management permission level threshold. For example, an operation such as deleting or creating is performed on a database in a cloud computing-based element management system according to a device management instruction sent by a client. Further, the user cannot manage a cloud computing-based EMS hardware resource and platform-level service, and can perform only limited application program settings, if the permission information does not meet a preset management permission condition.

Figure 7:
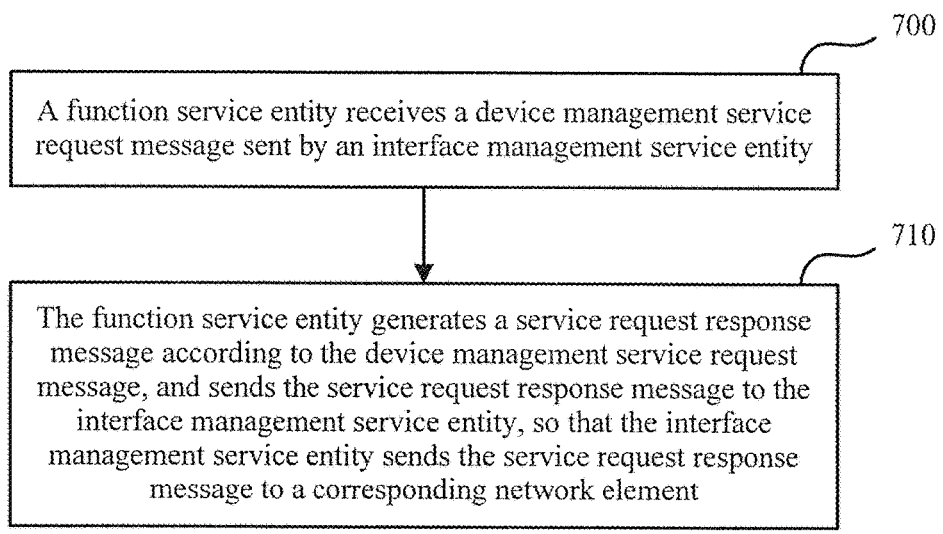
FIG. 7 is a detailed element management flowchart 2 according to an embodiment of the present invention.

Referring to FIG. 7, a specific process in which a function service entity in an element management system provides a service requested by a network element is as follows:

Step 700: The function service entity receives a device management service request message sent by an interface management service entity.

In this embodiment of the present invention, when the network element needs to initiates a request for a service, a corresponding device management service request message is generated and sent to the function service entity, and the function service entity obtains a network standard identifier carried in the device management service request message.

Step 710: The function service entity generates a service request response message according to the device management service request message, and sends the service request response message to the interface management service entity, so that the interface management service entity sends the service request response message to a corresponding network element.

In this embodiment of the present invention, the function service entity obtains, according to the network standard identifier carried in the device management service request message, a network standard adaptation submodule identifier corresponding to the network standard identifier; selects a network standard adaptation submodule corresponding to the network standard adaptation submodule identifier from all network standard adaptation submodules included in a network standard adaptation module of the function service entity; parses the device management service request message by using the network standard adaptation submodule corresponding to the network standard identifier; obtains a service request keyword carried in the device management service request message, where each network standard identifier corresponds to one network standard adaptation submodule. The network standard adaptation submodule is configured to receive a device management service request message sent by a network element working in a corresponding network standard, and parse the device management service request message, where the network standard adaptation module is a logical module in the function service entity; and a universal function adaptation module of the function service entity generates a service request response message according to a parsed device management service request message. The universal function adaptation module is configured to generate the service request response message based on the parsed device management service request message, and send the service request response message to a corresponding network standard adaptation submodule, where the universal function adaptation module is a logical module in the function service entity. When meanings indicated by service request keywords in all network standards are the same, the function service entity may include only the universal function adaptation module, and a local universal function adaptation module of the function service entity parses the device management service request message, and generates a service request response message based on a parsed device management service request message, where all network standard identifiers correspond to the universal function adaptation module, and the service request response message carries a network standard identifier corresponding to the network element.

The following describes in detail a specific element management procedure with reference to specific application scenarios by using an example in which a logical division manner shown in FIG. 4 is used, an element management system includes five function service entities and an interface management service entity and network standards in which network elements work include an LTE network standard, a WLAN standard, and a 3G network standard.

Implementation Manner 1

Figure 8:
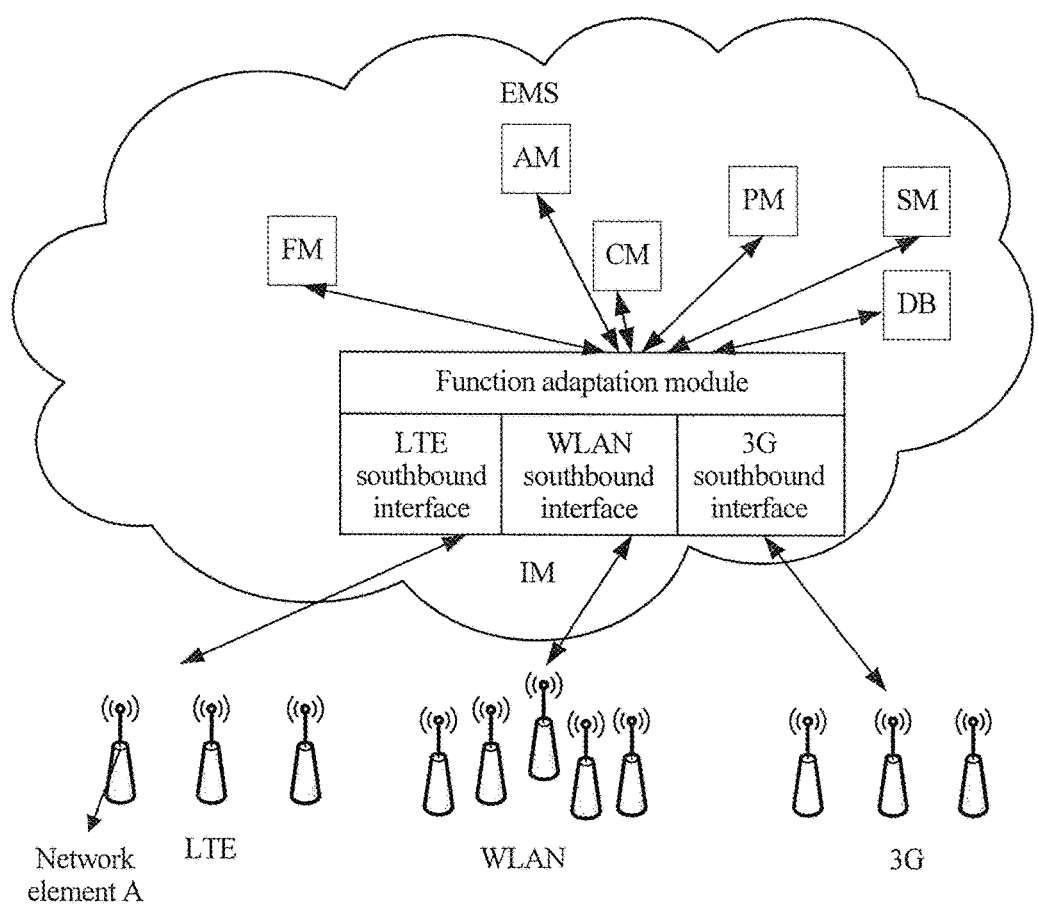
FIG. 8 is a schematic diagram 1 of a cloud computing-based element management system architecture in a specific application scenario according to an embodiment of the present invention.
Figure 9:
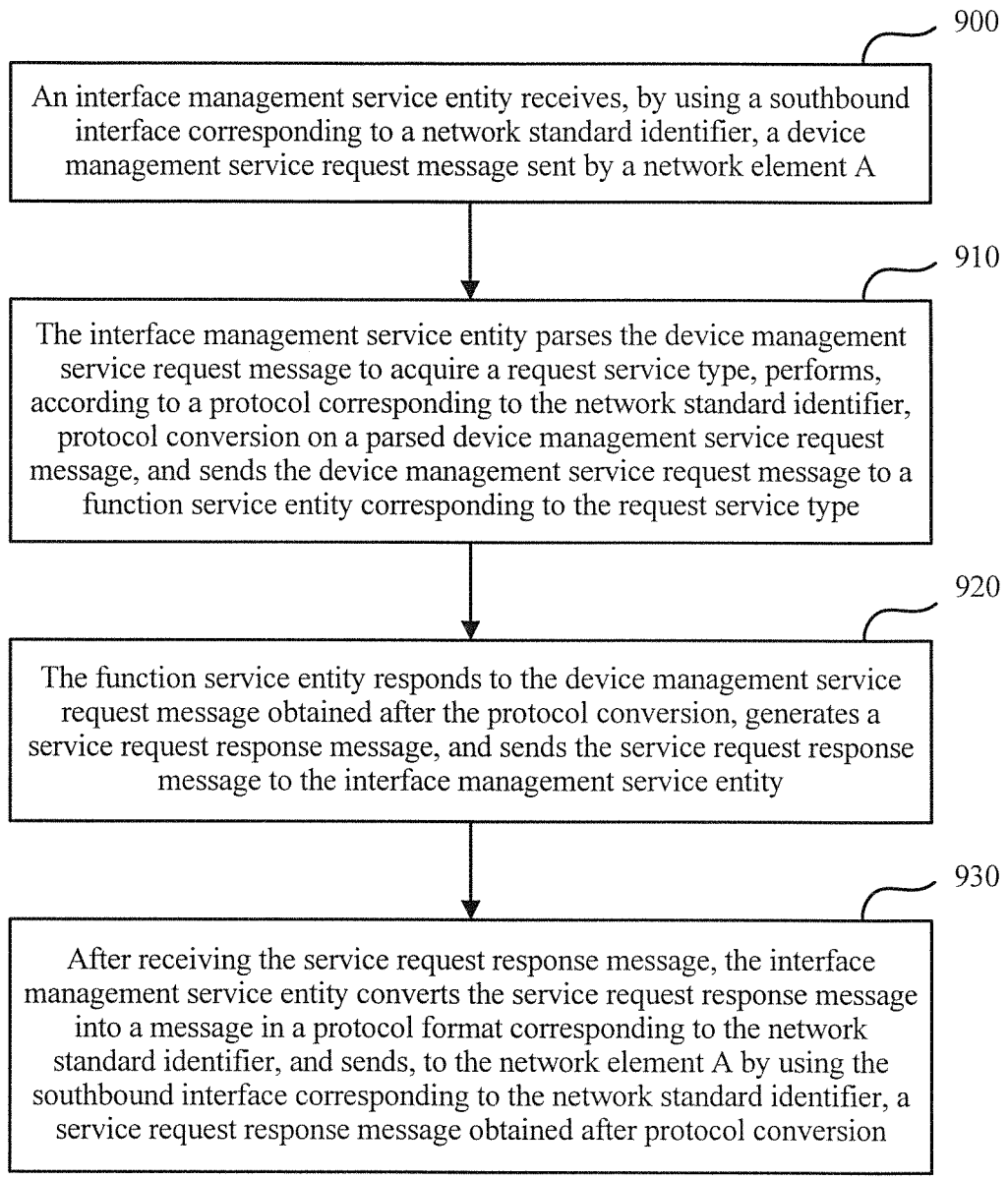
FIG. 9 is a schematic element management flowchart 1 in a specific application scenario according to an embodiment of the present invention.

In an embodiment of the present invention, referring to a cloud computing-based element management system shown in FIG. 8, or referring to an element management procedure shown in FIG. 9 if a service requested by a network element A (working in an LTE network standard) is an accounting management service, the element management procedure is as follows:

Step 900: An interface management service entity receives, by using a southbound interface corresponding to a network standard identifier, a device management service request message sent by a network element A.

In this embodiment of the present invention, the network standard identifier is an LTE network standard identifier, and the interface management service entity is located in a cloud computing-based element management system.

Step 910: The interface management service entity parses the device management service request message to obtain a request service type, performs, according to a protocol corresponding to the network standard identifier, protocol conversion on a parsed device management service request message, and sends the device management service request message to a function service entity corresponding to the request service type.

In this embodiment of the present invention, because the network standard identifier is the LTE network standard identifier, the southbound interface that parses the device management service request message is an LTE southbound interface. Because a service type requested by the network element A is the accounting management service, a function adaptation module of the interface management service entity performs protocol conversion on the device management service request message, and then sends, to an accounting management service entity, a device management service request message obtained after the protocol conversion, that is, invokes an accounting management service in the cloud computing-based element management system, where the accounting management service is located in the cloud computing-based element management system.

Step 920: The function service entity responds to the device management service request message obtained after the protocol conversion, generates a service request response message, and sends the service request response message to the interface management service entity.

In this embodiment of the present invention, because for the accounting management service, a problem of inconsistency of meanings indicated by a same service request keyword in different network standards does not exist, further logical function division does not need to be performed on the accounting management service entity.

Step 930: After receiving the service request response message, the interface management service entity converts the service request response message into a message in a protocol format corresponding to the network standard identifier, and sends, to the network element A by using the southbound interface corresponding to the network standard identifier, a service request response message obtained after protocol conversion.

In this embodiment of the present invention, after receiving the service request response message, the interface management service entity converts the service request response message into a message in a protocol format corresponding to LTE, and sends, to the network element A by using an LTE southbound interface, a service request response message obtained after protocol conversion.

Implementation Manner 2

Figure 10:
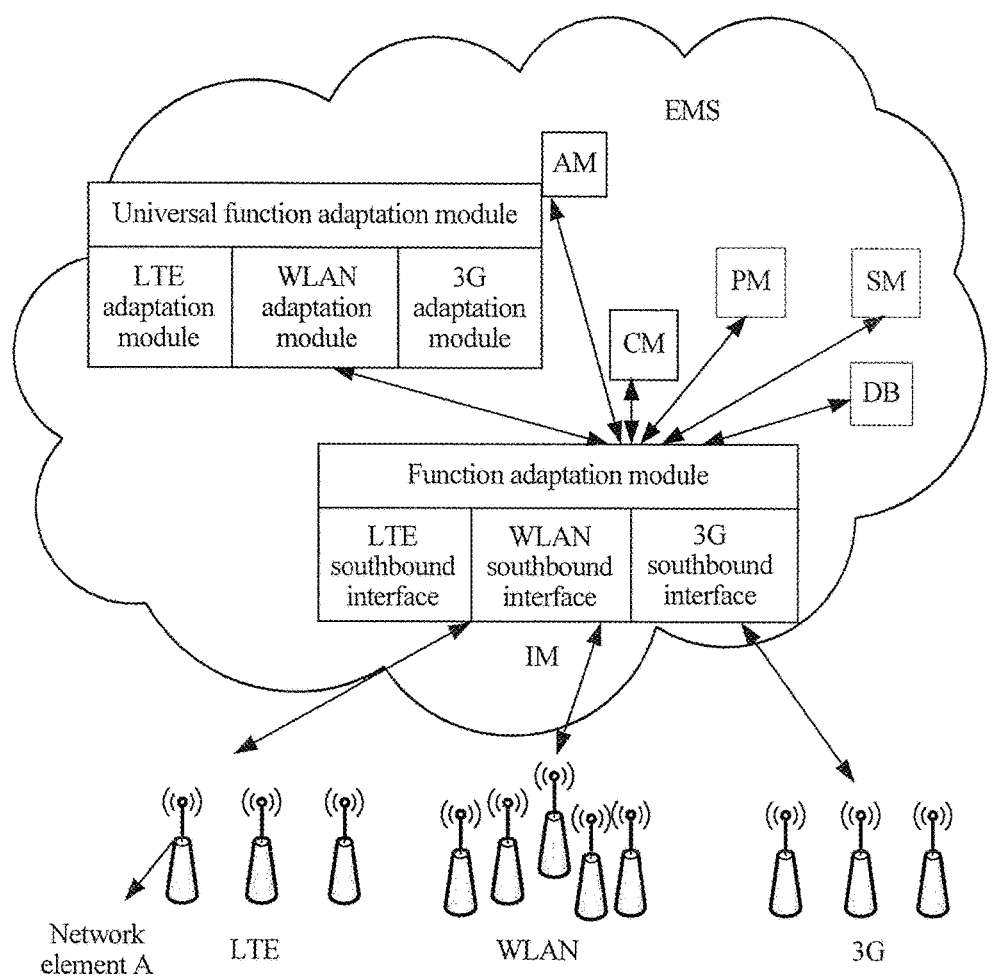
FIG. 10 is a schematic diagram 2 of a cloud computing-based element management system architecture in a specific application scenario according to an embodiment of the present invention.
Figure 11:
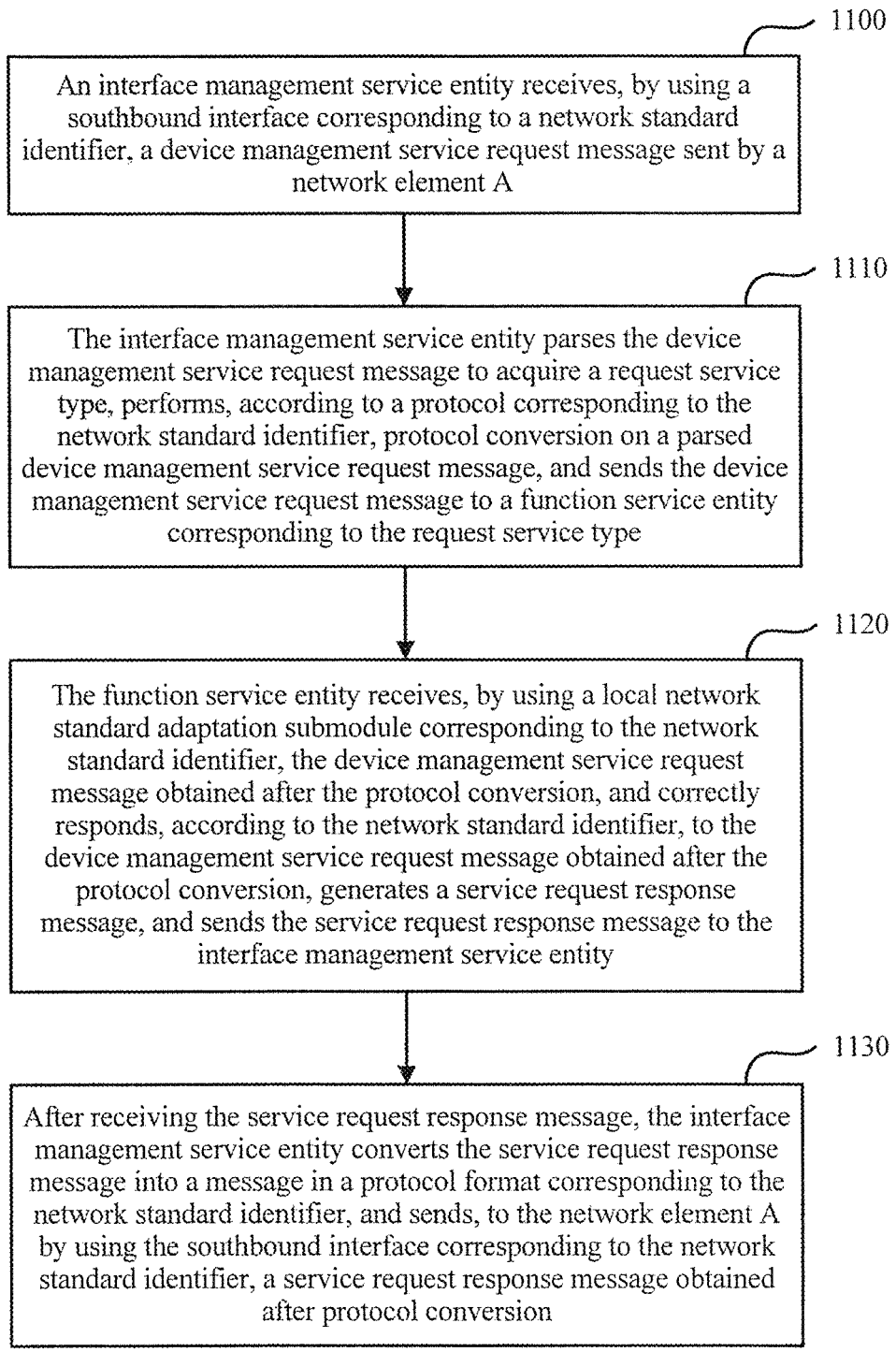
FIG. 11 is a schematic element management flowchart 2 in a specific application scenario according to an embodiment of the present invention.

In an embodiment of the present invention, referring to an element management system shown in FIG. 10, or referring to an element management procedure shown in FIG. 11 if a service requested by a network element A (working in an LTE network standard) is an alarm management service, the element management procedure is as follows:

Step 1100: An interface management service entity receives, by using a southbound interface corresponding to a network standard identifier, a device management service request message sent by a network element A.

In this embodiment of the present invention, the network standard identifier is an LTE network standard identifier, and the interface management service entity is located in a cloud computing-based element management system.

Step 1110: The interface management service entity parses the device management service request to obtain a request service type, performs, according to a protocol corresponding to the network standard identifier, protocol conversion on a parsed device management service request message, and sends the device management service request message to a function service entity corresponding to the request service type.

In this embodiment of the present invention, because the network standard identifier is the LTE network standard identifier, the southbound interface that parses the device management service request message is an LTE southbound interface. Because a service type requested by the network element A is the alarm management service, a function adaptation module performs protocol conversion on the device management service request message, and then sends, to an alarm management service entity in a cloud system, a device management service request message obtained after the protocol conversion, that is, invokes an alarm management service, where the alarm management service entity is located in the cloud computing-based element management system.

Step 1120: The function service entity receives, by using a local network standard adaptation submodule corresponding to the network standard identifier, the device management service request message obtained after the protocol conversion, correctly responds, according to the network standard identifier, to the device management service request message obtained after the protocol conversion, generates a service request response message, and sends the service request response message to the interface management service entity.

In this embodiment of the present invention, because for the alarm management service, a problem of inconsistency of meanings indicated by a same service request keyword in different network standards exists, further logical function division needs to be performed on the alarm management service entity.

Step 1130: After receiving the service request response message, the interface management service entity converts the service request response message into a message in a protocol format corresponding to the network standard identifier, and sends, to the network element A by using the southbound interface corresponding to the network standard identifier, a service request response message obtained after protocol conversion.

In this embodiment of the present invention, after receiving the service request response message, the interface management service entity located on a cloud system with respect to the network element A converts the service request response message into a message in a protocol format corresponding to LTE, and sends, to the network element A by using an LTE southbound interface, a service request response message obtained after protocol conversion.

Figure 12:
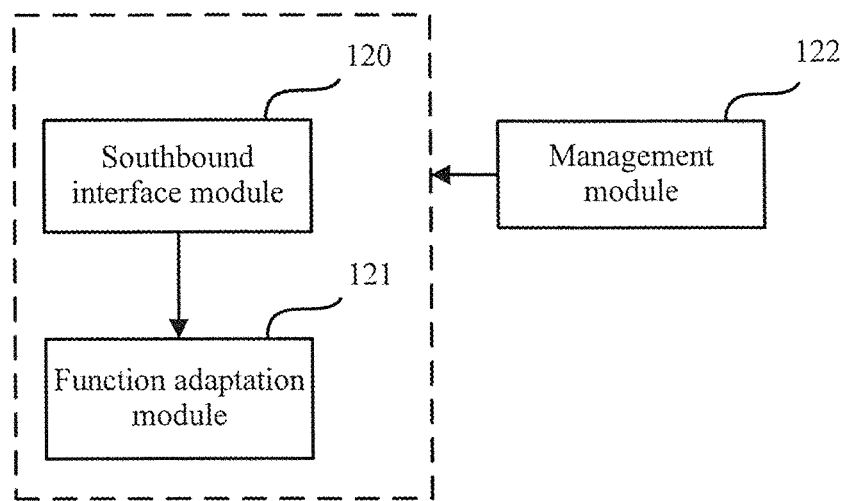
FIG. 12 is a schematic structural diagram 1 of an interface management service entity according to an embodiment of the present invention.

Based on the foregoing technical solutions, referring to FIG. 12, the present invention provides an interface management service entity, located in a cloud computing-based element management system, where the element management system further includes a network element and a function service entity, and the interface management service entity includes a southbound interface module 120 and a function adaptation module 121.

The southbound interface module 120 is configured to receive a device management service request message sent by the network element, obtain a network standard identifier that corresponds to the network element and is carried in the device management service request message, and sends the device management service request message to the function adaptation module 121.

The function adaptation module 121 is configured to: receive the device management service request message sent by the southbound interface module 120; perform protocol conversion on the device management service request message according to a protocol format corresponding to the network standard identifier; send, according to a service type carried in a device management service request message obtained after the protocol conversion, the device management service request message to the function service entity; receive a service request response message that is generated according to the device management service request message and sent by the function service entity; and send the service request response message to the southbound interface module 120.

The southbound interface module 120 is further configured to receive the service request response message sent by the function adaptation module 121, and send the service request response message to the network element.

Optionally, the southbound interface module 120 is specifically configured to read an interface identifier corresponding to the network standard identifier, obtain a southbound interface corresponding to the interface identifier, and receive the device management service request message by using the southbound interface corresponding to the interface identifier.

Optionally, the function adaptation module 121 is specifically configured to perform, according to the protocol format corresponding to the network standard identifier, protocol conversion on the device management service request message parsed by the southbound interface, to generate a device management service request message in a uniform protocol format.

Optionally, the function adaptation module 121 is specifically configured to obtain, according to a network standard identifier carried in the service request response message, an interface identifier corresponding to the network standard identifier, where the service request response message is a message in a uniform protocol format; and send the service request response message in the uniform protocol format to the southbound interface module 120.

Optionally, the southbound interface module 120 is specifically configured to receive the service request response message that is in the uniform protocol format and sent by the function adaptation module 121, perform protocol conversion on the service request response message in the uniform protocol format, to generate a service request response message in the protocol format corresponding to the network standard identifier, and send, to the network element by using the southbound interface corresponding to the interface identifier, the service request response message in the protocol format corresponding to the network standard identifier.

Further, the foregoing interface management service entity further includes a management module 122, configured to receive a device management instruction sent by a client, and obtain permission information carried in the device management instruction; and manage, according to the device management instruction, a platform-level service of the cloud computing-based element management system if the permission information meets a preset management permission condition.

Figure 13:
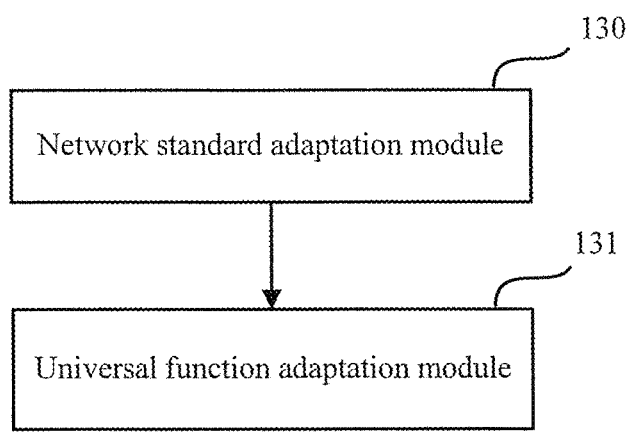
FIG. 13 is a schematic structural diagram 1 of a function service entity according to an embodiment of the present invention.

Referring to FIG. 13, the present invention further provides a function service entity, located in a cloud computing-based element management system, where the element management system further includes a network element and an interface management service entity, and the function service entity includes a network standard adaptation module 130 and a universal function adaptation module 131.

The network standard adaptation module 130 is configured to receive a device management service request message sent by an interface management service entity, and send the device management service request message to the universal function adaptation module 131.

The universal function adaptation module 131 is configured to receive the device management service request message sent by the network standard adaptation module 130, generate a service request response message according to the device management service request message, and send the service request response message to the network standard adaptation module 130.

The network standard adaptation module 130 is further configured to receive the service request response message sent by the universal function adaptation module 131, and send the service request response message to the interface management service entity, so that the interface management service entity sends the service request response message to a corresponding network element, where the corresponding network element is a network element that sends a device management service request message to the interface management service entity.

Optionally, the network standard adaptation module 130 is specifically configured to obtain, according to a network standard identifier carried in the device management service request message, a network standard adaptation submodule corresponding to the network standard identifier, and parse the device management service request message by using the network standard adaptation submodule corresponding to the network standard identifier, where each network standard identifier corresponds to one network standard adaptation submodule.

Optionally, the universal function adaptation module 131 is specifically configured to generate a service request response message according to a parsed device management service request message; or generate a service request response message based on a parsed device management service request message, where all network standard identifiers correspond to the universal function adaptation module, and the service request response message carries a network standard identifier corresponding to the network element.

Figure 14:
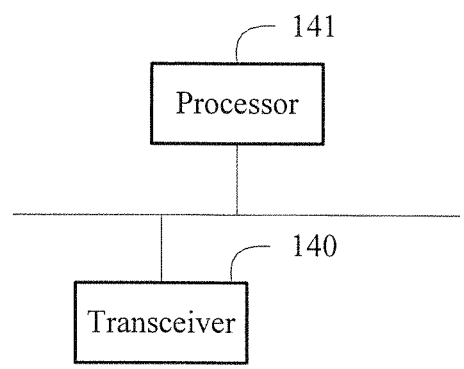
FIG. 14 is a schematic structural diagram 2 of an interface management service entity interface according to an embodiment of the present invention.

Based on the foregoing technical solutions, referring to FIG. 14, the present invention further provides an interface management service entity, located in a cloud computing-based element management system, where the element management system further includes a network element and a function service entity, and the interface management service entity includes a transceiver 140 and a processor 141.

The transceiver 140 is configured to receive a device management service request message sent by a network element, and send the device management service request message to the processor 141.

The processor 141 is configured to receive the device management service request message sent by the transceiver 140, obtain a network standard identifier that corresponds to the network element and is carried in the device management service request message, perform protocol conversion on the device management service request message according to a protocol format corresponding to the network standard identifier, and send a device management service request message obtained after the protocol conversion to the transceiver 140.

The transceiver 140 is further configured to receive the device management service request message that is obtained after the protocol conversion and sent by the processor 141, send, according to a service type carried in the device management service request message obtained after the protocol conversion, the device management service request message to the function service entity, receive a service request response message that is generated according to the device management service request message and sent by the function service entity, and send the service request response message to the network element.

Optionally, the transceiver 140 is specifically configured to receive the device management service request message by using the southbound interface corresponding to the interface identifier.

Optionally, the processor 141 is specifically configured to perform, according to the protocol format corresponding to the network standard identifier, protocol conversion on the device management service request message parsed by the southbound interface, to generate a device management service request message in a uniform protocol format.

Optionally, the processor 141 is specifically configured to obtain, according to a network standard identifier carried in the service request response message, an interface identifier corresponding to the network standard identifier, where the service request response message is a message in a uniform protocol format; perform protocol conversion on the service request response message in the uniform protocol format, to generate a service request response message in a protocol format corresponding to the network standard identifier.

Optionally, the transceiver 140 is further configured to send the service request response message in the protocol format corresponding to the network standard identifier to the network element by using the southbound interface corresponding to the interface identifier.

Further, the transceiver 140 is configured to receive a device management instruction sent by a client, and send the device management instruction to the processor 141.

Further, the processor 141 is further configured to receive the device management instruction sent by the transceiver 140, obtain permission information carried in the device management instruction; and manage, according to the device management instruction, a platform-level service of the cloud computing-based element management system if the permission information meets a preset management permission condition.

Figure 15:
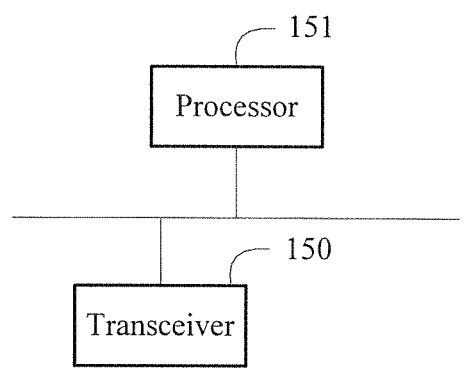
FIG. 15 is a schematic structural diagram 2 of a function service entity according to an embodiment of the present invention.

Referring to FIG. 15, the present invention further provides a function service entity, located in a cloud computing-based element management system, where the element management system further includes a network element and an interface management service entity, and the function service entity includes a transceiver 150 and a processor 151.

The transceiver 150 is configured to receive a device management service request message sent by an interface management service entity, and send the device management service request message to the processor 151.

The processor 151 is configured to receive the device management service request message sent by the transceiver 150, generate a service request response message according to the device management service request message, and send the service request response message to the transceiver 150.

The transceiver 150 is further configured to receive the service request response message sent by the processor 151, and send the service request response message to the interface management service entity, so that the interface management service entity sends the service request response message to a corresponding network element, where the corresponding network element is a network element that sends a device management service request message to the interface management service entity.

Optionally, the processor 151 is specifically configured to obtain, according to a network standard identifier carried in the device management service request message, a network standard adaptation submodule corresponding to the network standard identifier; and parse the device management service request message by using the network standard adaptation submodule corresponding to the network standard identifier, where each network standard identifier corresponds to one network standard adaptation submodule.

Optionally, the processor 151 is specifically configured to generate a service request response message according to a parsed device management service request message; or generate a service request response message based on a parsed device management service request message, where all network standard identifiers correspond to the universal function adaptation module, and the service request response message carries a network standard identifier corresponding to the network element.

In conclusion, in the embodiments of the present invention, an interface management service entity receives a device management service request message sent by a network element, obtains a network standard identifier that corresponds to the network element and is carried in the device management service request message, and performs protocol conversion on the device management service request message according to a protocol format corresponding to the network standard identifier; the interface management service entity sends, according to a service type carried a device management service request message obtained after the protocol conversion, the device management service request message to a function service entity, receives a service request response message that is generated according to the device management service request message and sent by the function service entity, and sends the service request response message to the network element. According to the technical solutions in the present invention, a cloud computing-based element management system manages multiple network elements working in different standards, which avoids a resource waste problem caused when multiple element management systems are used to manage network elements working in different standards, and effectively improves hardware utilization.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, a person skilled in the art can make changes and modifications to these embodiments once they learn the basic inventive concept. Therefore, the following claims are intended to be construed as to cover the preferred embodiments and all changes and modifications falling within the scope of the present invention.

Apparently, a person skilled in the art may make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. An interface management service entity, located in a cloud computing-based element management system, wherein the element management system further comprises a network element and a function service entity, the interface management service entity comprising:
a transceiver configured to receive a device management service request message sent by the network element, wherein the network element works in one of a plurality of predetermined network standards;
a processor configured to:
provide an interface module having, for each respective network standard of the plurality of predetermined network standards, a respective interface,
receive the device management service request message from the transceiver,
obtain, using the interface module, a network standard identifier that corresponds to the one of the respective network standards that the network element works in and is carried in the device management service request message,
select the respective interface corresponding to the respective network standard corresponding to the obtained network standard identifier to receive the device management service request message;
perform protocol conversion on the device management service request message according to a protocol format corresponding to the network standard identifier, and
send a converted device management service request message obtained after the protocol conversion to the transceiver; and
wherein the transceiver is further configured to:
receive the converted device management service request message sent by the processor,
send, according to a service type carried in the device management service request message, the converted device management service request message to the function service entity,
receive a service request response message that is generated according to the converted device management service request message and sent by the function service entity, and
send the service request response message to the network element.

2. The interface management service entity according to claim 1, wherein the interface module having, for each respective network standard of the plurality of predetermined network standards, a respective interface further comprises:
  a southbound interface module having, for each respective network standard of the plurality of predetermined network standards, a respective southbound interface, wherein each respective southbound interface corresponds to a respective interface identifier; and
  wherein the processor is configured to:
  obtain the respective interface identifier corresponding to the network standard identifier, a select the respective southbound interface corresponding to the respective interface identifier, and receive the device management service request message by using the respective southbound interface corresponding to the respective interface identifier.

3. The interface management service entity according to claim 2, wherein the processor is configured to:
  parse the device management service request message using the respective southbound interface; and
  perform, according to the protocol format corresponding to the network standard identifier, protocol conversion on the device management service request message parsed by the respective southbound interface, to generate the converted device management service request message in a uniform protocol format.

4. The interface management service entity according to claim 2, wherein the processor is configured to:
  obtain, according to the network standard identifier carried in the service request response message, the respective interface identifier corresponding to the network standard identifier, wherein the service request response message is a message in a uniform protocol format; and send the service request response message in the uniform protocol format to the respective southbound interface corresponding to the respective interface identifier.

5. The interface management service entity according to claim 4, wherein the transceiver is configured to:
  receive the service request response message that is in the uniform protocol format and sent by the function adaptation module, perform protocol conversion on the service request response message in the uniform protocol format to generate a service request response message in the protocol format corresponding to the network standard identifier, and send, to the network element by using the respective southbound interface corresponding to the respective interface identifier, the service request response message in the protocol format corresponding to the network standard identifier.

6. The interface management service entity according to claim 1, the transceiver is further configured to:
  receive a device management instruction sent by a client;
  obtain permission information carried in the device management instruction; and
  manage, according to the device management instruction, a platform-level service of the cloud computing-based element management system if the permission information meets a preset management permission condition.

7. An element management method, applied in a cloud computing-based element management system, wherein the element management system comprises a network element, a function service entity, and an interface management service entity, the method comprising:
  receiving, by the interface management service entity, a device management service request message sent by the network element, wherein the network element works in one of a plurality of different predetermined network standards,
  providing, by the interface management service entity, an interface module having, for each respective network standard of the plurality of different predetermined network standards, a respective interface; and
  obtaining, by the interface module, a network standard identifier that corresponds to the one of the respective network standards that the network element works in and is carried in the device management service request message;
  selecting, by the interface management service entity, the respective interface corresponding to the respective network standard corresponding to the obtained network standard identifier to receive the device management service request message;
  performing, by the interface management service entity, protocol conversion on the device management service request message according to a protocol format corresponding to the network standard identifier;
  sending, by the interface management service entity according to a service type carried in a converted device management service request message obtained after the protocol conversion, the converted device management service request message to a function service entity;
  receiving a service request response message that is generated according to the converted device management service request message and sent by the function service entity; and
  sending, by the interface management service entity, the service request response message to the network element.

8. The method according to claim 7, wherein receiving, by the interface management service entity, a device management service request message sent by the network element comprises:
  wherein providing, by the interface management service entity, an interface module having, for each respective network standard of the plurality of different predetermined network standards, a respective interface further comprises:
    providing, by the interface management service entity, a southbound interface module having, for each respective network standard of the plurality of different predetermined network standards, a respective southbound interface, wherein each respective southbound interface corresponds to a respective interface identifier; and
    reading, by the interface management service entity, the respective interface identifier corresponding to the network standard identifier, selecting, from the southbound interface module of the interface management service entity, the respective southbound interface corresponding to the respective interface identifier, and receiving the device management service request message by using the respective southbound interface corresponding to the respective interface identifier.

9. The method according to claim 8, wherein performing, by the interface management service entity, protocol conversion on the device management service request message according to a protocol format corresponding to the network standard identifier comprises:
  parsing, by the interface management service entity, the device management service request message by using the respective southbound interface corresponding to the network standard identifier; and performing, by the interface management service entity by using a function adaptation module in the interface management service entity according to the protocol format corresponding to the network standard identifier, protocol conversion on the parsed device management service request message, to generate a converted device management service request message in a uniform protocol format.

10. The method according to claim 8, wherein sending, by the interface management service entity, the service request response message to the network element comprises:

obtaining, by the interface management service entity according to the network standard identifier carried in the service request response message, the respective interface identifier corresponding to the network standard identifier, wherein the service request response message is a message in a uniform protocol format;

sending, by the interface management service entity, the service request response message in the uniform protocol format to the respective southbound interface corresponding to the respective interface identifier, and performing protocol conversion on the service request response message in the uniform protocol format by using the respective southbound interface corresponding to the respective interface identifier, to generate a service request response message in the protocol format corresponding to the network standard identifier; and sending, by the interface management service entity, the service request response message in the protocol format corresponding to the network standard identifier to the network element by using the respective southbound interface corresponding to the respective interface identifier.

11. The method according to claim 7, further comprising:

receiving, by the interface management service entity, a device management instruction sent by a client, and obtaining permission information carried in the device management instruction; and managing, by the interface management service entity according to the device management instruction, a platform-level service of the cloud computing-based element management system if the permission information meets a preset management permission condition.

* * * * *